(12) United States Patent
Burris et al.

(10) Patent No.: US 11,727,520 B2
(45) Date of Patent: *Aug. 15, 2023

(54) FRICTIONLESS SECURITY MONITORING AND MANAGEMENT

(71) Applicant: NCR Corporation, Atlanta, GA (US)

(72) Inventors: Matthew Robert Burris, Atlanta, GA (US); Christopher John Costello, Suwanee, GA (US); Gregory Joseph Hartl, Atlanta, GA (US); Sudip Rahman Khan, Decatur, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,900

(22) Filed: Nov. 19, 2021

(65) Prior Publication Data

US 2022/0076365 A1    Mar. 10, 2022

Related U.S. Application Data

(63) Continuation of application No. 16/724,560, filed on Dec. 23, 2019, now Pat. No. 11,238,554, which is a
(Continued)

(51) Int. Cl.
    *G06Q 50/26*      (2012.01)
    *G06Q 30/02*      (2023.01)
    (Continued)

(52) U.S. Cl.
    CPC ....... *G06Q 50/265* (2013.01); *G06Q 30/0281* (2013.01); *G06V 40/172* (2022.01);
    (Continued)

(58) Field of Classification Search
    CPC ...................................................... H04W 8/22
    See application file for complete search history.

(56) References Cited

U.S. PATENT DOCUMENTS 7,843,491 B2 * 11/2010 Vallone ............ G08B 13/19693
                                                            348/143
8,373,753 B2 *  2/2013 Cheng .................. G06V 40/172
                                                            713/186
(Continued)

FOREIGN PATENT DOCUMENTS

EP           2633599 A2 *  9/2013   ............ B60L 3/0069
EP           3544005 A1 *  9/2019
(Continued)

OTHER PUBLICATIONS

Lyon, David. "Biometrics, identification and surveillance." Bioethics 22.9 (2008): 499-508. (Year: 2008).*
(Continued)

*Primary Examiner* — Thomas L Mansfield
(74) *Attorney, Agent, or Firm* — Schwegman Lundberg & Woessner, P.A.

(57) ABSTRACT

Zones a defined within an enterprise. Video captured from the zones are monitored for threats (financial or physical). Any transaction data associated with transactions are monitored with the video along with sensor data captured from sensors within the zones. Threat policies are evaluated to identify actions and behaviors of individuals within the zones and threat scores are maintained. When a current threat score associated with a specific type of threat for a given individual or set of individuals exceeds a threshold, one or more automated remediation or threat avoidance actions are processed to mitigate and/or prevent the perceived threat.

20 Claims, 4 Drawing Sheets

Related U.S. Application Data continuation-in-part of application No. 16/696,870, filed on Nov. 26, 2019, now Pat. No. 11,321,655.

(51) Int. Cl.

| | |
|---|---|
| *H04W 12/06* | (2021.01) |
| *H04W 8/22* | (2009.01) |
| *G10L 15/18* | (2013.01) |
| *G10L 15/22* | (2006.01) |
| *G08B 21/02* | (2006.01) |
| *G06V 40/20* | (2022.01) |
| *G06V 40/16* | (2022.01) |

(52) U.S. Cl.
CPC ............. *G06V 40/20* (2022.01); *G08B 21/02* (2013.01); *G10L 15/18* (2013.01); *G10L 15/22* (2013.01); *H04W 8/22* (2013.01); *H04W 12/06* (2013.01)

(56) References Cited

U.S. PATENT DOCUMENTS

| | | | |
|---|---|---|---|
| 9,245,190 B2 * | 1/2016 | Rosenkrantz | ............ H04N 7/18 |
| 10,817,688 B1 * | 10/2020 | Ho | .......... B25J 9/1697 |
| 2016/0364927 A1 * | 12/2016 | Barry | ..................... H04L 63/08 |
| 2019/0180586 A1 * | 6/2019 | Script | ........................ G06T 7/50 |

FOREIGN PATENT DOCUMENTS

| | | | | |
|---|---|---|---|---|
| WO | WO-2016016277 A1 * | 2/2016 | ............ | G06F 19/00 |
| WO | WO-2016065362 A1 * | 4/2016 | ............ | B25J 11/008 |

OTHER PUBLICATIONS

Demirkus, Meltem, Kshitiz Garg, and Sadiye Guler. "Automated person categorization for video surveillance using soft biometrics." Biometric Technology for Human Identification VII. vol. 7667. SPIE, 2010. (Year: 2010).*

* cited by examiner

FRICTIONLESS SECURITY MONITORING AND MANAGEMENT

RELATED APPLICATIONS

The present application is a continuation of U.S. patent application Ser. No. 16/724,560 filed Dec. 23, 2019, which is a Continuation-In Part of U.S. patent application Ser. No. 16/696,870 filed Nov. 26, 2019, which Applications and Publications are incorporated by reference herein in their entirety.

BACKGROUND

Security issues and fraud do not occur in only secured areas of an enterprise but can happen in public spaces that any staff member, consumer, or member of the public may enter. This creates the need to monitor these areas for potential issues from an individual or set of individuals. These concerns can impact several aspects of enterprise operations, including opening and closing procedures, which are designed to limit the possibility of staff being taken hostage by individuals hiding lying in wait.

Moreover, detecting indications of fraud, money laundering, violent crimes, and theft require constant vigilance of employees to identify any visually detected signs provided from perpetrators, recognize the problem, and take appropriate actions. Enterprise procedures are put in place along with training to assist staff, however, much of these procedures rely heavily on a human element, which requires constant awareness, vigilance, and a certain degree of intuition and/or clairvoyance. Complicating matters, staff may not observe the behaviors, may be intentionally distracted, and/or may be concerned that it is their own biases that are in play; rather, than an actual issue being observed. Still further, it may be the staff that is exhibiting the warning signs of a security issue and not the customers of the enterprise.

Additionally, because of threats of violence that seem prevalent in society, nearly every enterprise engages its employees in some form of training that is designed to monitor staff and consumer behaviors for warning signs. Unfortunately, enterprises have to be prepared for random acts of violence that many times have nothing whatsoever to do with theft or fraud. In fact, because of the increase in violence that seemingly has nothing to do with theft, certain legal obligations have been imputed to the enterprises for purposes of providing a minimal level of care to both customers and staff of the enterprises.

SUMMARY

In various embodiments, methods and a system for frictionless security monitoring and management are presented.

According to an embodiment, a method for frictionless security monitoring and management is presented. An individual is monitored within a zone from at least a video feed. Threat policies associated with the zone are enforced. A determination is made that a behavior or an action of the individual while the individual is within the zone is associated with a specific threat based on enforcement of the threat policies. A current threat score is increased based on the threat type, and a mitigation action is processed when the current threat score exceeds a threshold value.

DETAILED DESCRIPTION

Figure 1:
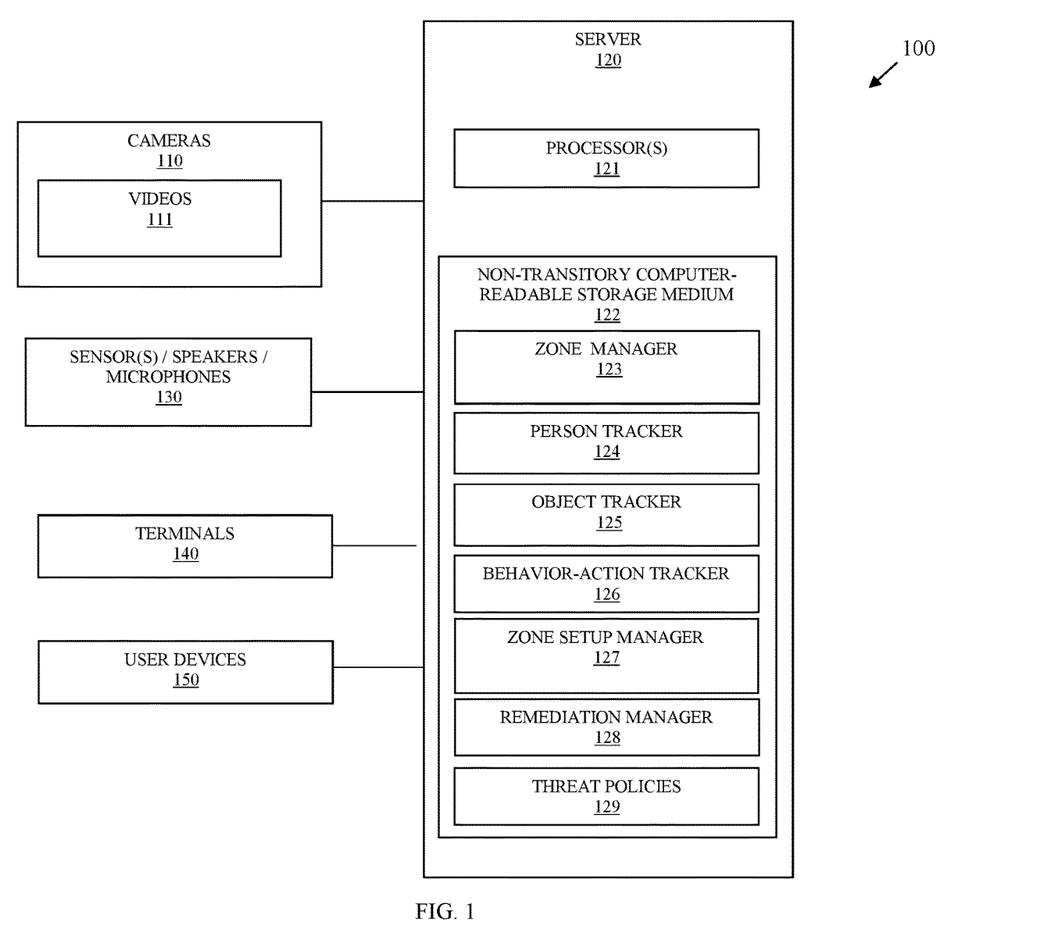
FIG. 1 is a diagram of a system for frictionless security monitoring and management, according to an example embodiment.

FIG. 1 is a diagram of a system 100 for frictionless security monitoring and management according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless security monitoring and management, presented herein and below.

System 100 is a full autonomous and customizable security monitoring and management system that utilizes sensor data, terminal data, and computer vision to monitor and track behaviors of individuals (staff of an enterprise and customers of the enterprise) and provide automated remediation actions. System 100 may also provide metrics regarding transactions and incidents for purposes of discovering and improving existing establishment's processes.

As used herein and below, the terms "user," "personnel," "actor," "person," "individual," and "subject" may be used interchangeably and synonymously. The terms refer to an individual detected within a secure area, public area, or any monitored area or an enterprise.

The phrases "security procedures," "security policies," and "threat policies," may be used synonymously and interchangeably herein and below. These phrases comprise, inter alia, enterprise business rules associated with business processes, security procedures, and/or suspicious observed behaviors as defined the establishment/enterprise.

A "business process" or a "suspicious observed behavior" as used herein, refers to a set of activities, actions, or behaviors required in performance of a predefined task or needed to identify a security threat (financial threat or a threat of physical violence).

An "object" refers to an asset or structure located within the establishment. The object may include drawers, computers, keys, cash, checks, tables, security panels, chairs, windows, notary stamps, doors, documents, terminals, countertops, shelving, items being sold within the establishment, etc. that are being monitored within the image frames of one or more videos provided in video feeds.

A "zone" refers to a predefined area being monitored within the establishment from the frames of the one or more video feeds.

Each zone may be assigned a specific set of assigned security monitoring level. Each zone may include multiple objects and zero or more subjects at any given point in time. An object may be moved from one zone to another zone. Each object and each subject are assigned their own security monitoring levels, which can change (be increase or be decreased) depending on current sensor data, current transaction data, current computer vision actions/behaviors observed from the video feeds, and the zone within which they appear.

System 100 includes a plurality of cameras 110, at least one server 120, a variety of sensors 130, terminals 140, and user-operated devices 150. Cameras 110 capture time-stamped videos of persons and objects outside and on a premise of an establishment and within the establishment. Sensors 130 comprise speakers, microphones, and other sensors 130 discussed herein and below. Terminals 140 are used to process transactions associated with the establishment. User-operated devices 150 include customer-operated mobile devices or establishment-operated mobile devices or desktops.

Server 120 includes executable instructions that execute on one or more hardware processors 121 of server 120 from a non-transitory computer-readable storage medium 122 as: zone manager 123, person tracker 124, object tracker 125, behavior-action tracker 126, zone setup manager 127, and remediation manager 128. Non-transitory computer-readable-storage medium 122 also includes threat policies 129.

Threat policies 129 represent a data structure comprising and embodying business rules associated with predefined business processes/procedures and/or observed threat behaviors/actions as defined by an establishment. Threat policies 129 include statements of zone identifiers, asset/object identifiers, action identifiers, behavior identifiers, security role identifiers for security roles and responsibilities, transaction data identifiers for types of transaction data required for any given task, task identifiers that identify specific tasks, sensor data identifiers for types of sensor data, and conditions that defines rules. Each rule identifying one or more observed threats, behaviors, any transaction information associated with a given transaction, and any sensor information associated with sensor data. The sequence of the threats may also be defined within the conditions for the rules. Each rule may also include a resource identifier or a remediation processing action that is to be processed when a given rule is violated. The resource associated with the resource identifier may be an automated application, a system, or an electronic contact address of an individual.

It is to be noted that there may be multiple servers 120, such that the different elements 123-128 may execute on a same server 120 or multiple different servers 120 networked together.

Cameras 110 are preconfigured to capture videos 111 of areas that are inside and outside the establishment based on the field-of-view of the lenses of cameras 110. Some of cameras 110 may capture images 111 representing portions of a different area than a different one of the cameras 110 captures video 111 for. That is, each video 111 can include frames that may overlap multiple ones of the defined areas.

In an embodiment, the cameras 110 can be situated at different angles and heights within the areas where they are located. Some cameras 110 may be at waist level, chest level, or head level to an average sized person and directed in different directions upward or downward slightly for purposes of capturing the eyes of individuals within the room. Additionally, there may be one or more overhead cameras 110 both inside and outside the establishment. Some cameras 110 may be specifically calibrated to capture eyes and faces of the individuals.

Initially, cameras 110 are situated in locations throughout the establishment and one or more cameras 110 may situated on the outside of the establishment to capture the egress and ingress point of the establishment and optionally to capture a parking lot or a premises that is associated with the establishment Each camera lens configured to cover one or more predefined areas both inside and/or outside the establishment.

Furthermore, metadata is assigned to each camera 110 to include a unique camera identifier, a location identifier (representing the physical location that camera 110 is situated), and one or more area identifiers (representing the predefined areas that the lens of camera 110 captures in the video 111).

Terminals 140 comprise transaction processing devices that are operated by employees and/or customers of the establishment during transactions. Transactions may comprise processing actions initiated by the employees in performance of a portion of a task associated with the establishment.

Initially, zones and threat policies are assigned and defined for public and private areas of the enterprise through interfaces associated with zone setup manager 127. Authorized staff operate user devices 150 associated with the enterprise to access the interfaces over a secure wired network, a secure wireless network, or a combination of a secure wired and a secure wireless network.

Authorized staff logs into the secure network for access to the interfaces associated with zone setup manager 127 and defines zones and threat policies 129 for each zone, each asset or object of a given zone, and individuals within the given zone. The interface presents a map of the establishment along with camera placement within a physical layout of the establishment. The interface may permit a creation of a map for the establishment if one is non-existent. Enterprise assigned Identifiers for assets/resources/structures (objects) may be dragged and dropped into the map that is being created with a working environment of the interface.

Assets/resources/structures may be rotated and placed within the environment. Cameras 110 are designated as a special type of asset within the environment where the map is being constructed. When a given camera 110 is selected, the interface brings up a sub-view or popup window that shows a live video feed associated with the field-of-view of the selected camera 110 (the view displayed may also be a still image of the field-of-view captured from the camera 110 at selected times of day).

Once the field-of-view for the lens of the selected camera 110 is depicted, the authorized staff member can create a zone by dragging, sizing, and shaping a polygon to outline a defined portion of the field-of-view and assign the dynamically shaped outline as a zone. Zone setup manager 127 assigns a zone identifier to the zone. A type of zone may be defined through the interface before, during, or after creation of the zone. The type of zone identifies a set of predefined threat policies 129 (security monitoring and tracking rules based on observed threats). The type may be designated as private, public, mixed private and public, or secure with restricted access. The threat policies 129 can be selected from the predefined threat policies 129 associated with the selected type of zone or custom created through a rules interface. Custom-selected rules may require approval from a second authorized staff member before being saved and implemented by the zone setup manager 127.

The custom-defined zone may include an entire field-of-view for a selected camera 110 or a subset of the field-of-view. Zone setup manager 127 assigns the pixel locations for the zone within frames of the video captured by the selected camera 110. Area identifiers associated with the selected camera 110 are associated with the custom-defined zone along with its corresponding the zone identifier.

Objects (assets, resources, and/or structures) can be assigned and placed in the working environment of the interface. Each selected and placed object is assigned an object type (such as secure, restricted, public, etc.). Predefined threat policies 129 associated with each selected object type is provided through the interface. Custom threat policies 129 may also be defined by the authorized staff member and depending upon the object-assigned type may require further approval by a different authorized staff member before being implemented by zone setup manager 127.

Once the physical map layout and zones are defined with the objects and the corresponding threat policies 129 are assigned, the zone setup manager 127 defines each zone and its policies 129. Before enforcing threat policies 129 for each zone by zone manager 123 further authorizations and approvals may be required by automated systems and/or personnel; or, a given zone definition and its threat policies 129 may be immediately implemented for enforcement through zone manager 123.

Zone manager 123 enforces the threat policies 129 within each zone based on that zone's definition (objects and location) utilizing: any transaction data provided in real time by terminals 140, action and behavior identifiers for actions and behaviors provided in real time by behavior-action tracker 126, person or individual identifiers provided by person tracker 124, object identifiers provided by object tracker 125, and sensor data provided by sensors 130.

Zone manager 123 manages frames of video based on zone identifiers defined in the frames based on identifiers, sensor data, and transaction data reported by trackers 124-126, sensors 130, and terminals 140. The zone identifier is associated with a given set of threat policies 129, each threat policy 129 includes conditions defined as statements that utilizes the identifiers, sensor data, and transaction data, which are plugged into the statements when received from trackers 124-126 along with any corresponding sensor data and transaction data for any transaction taking place. Each rule or set of rules with policies 129 may include a remediation action identifier of set of action identifiers, which are passed by zone manager 123 to remediation manager 128 for processing when conditions are satisfied or not satisfied within the statements of the threat policies 129.

Sensors 130 comprise: daylight sensors, infrared (IR) sensors, Ultraviolet (UV) sensors, mm wave sensors, structured light sensors, LIDAR-based volumetric sensors (Light Detecting and Ranging), wireless communication sensors (Bluetooth®, Wi-Fi, Near Field Communication (NFC), etc.), sound detection sensors, etc. Sensors 130 may also include microphones and speakers for receiving spoken audio and playing audio within the enterprise. The sensors 130 are another type of object (asset or resource), which may be defined within a given zone definition and assigned a predefined set of threat policies 129 or provided a customized set of threat policies 129 (as discussed above).

Person tracker 124 analyzes pixels in video frames of video feeds 111 and uses a bounding box or region of interest within the pixels to track locations of the individuals and extremities (arms, hands) of the individuals within a known area (which is associated with a zone identifier) of the establishment based on the area identifiers associated with cameras 110.

Object tracker 125 monitors the structures and assets within the establishment via bounding boxes or regions of interest within pixels of the image frames for the video feeds 111.

Behavior-action tracker 127 utilizes the bounding boxes associated with each individual and the objects to perform more detailed pixel analysis on facial features of the individuals and identify behaviors identified by specific behavior identifiers. Moreover, location information within the pixels for the bounding boxes of the individuals and the objects are used by behavior-action tracker 127 to identify actions that corresponding to action identifiers.

Zone manager 123 receives transaction identifiers from terminals 140 as well as operation identifiers for operations being performed and parameter data supplied as input to the operations by the employees or customers during transactions at terminals 140.

Trackers 124-126 provides identifiers and location information for any transaction of one or more individuals from video feeds 111 and objects; zone manager 123 determines from policies 129 (along with any transaction data and sensor data) when a given action or behavior of any individual warrants a response by remediation manager 128 in accordance with procedures defined within rules of policies 129. Based on the policy evaluation, zone manager 123 determines when there is a financial and/or physical threat.

Some non-compliant actions, non-compliant behaviors, non-compliant transaction information, financial threat actions/behaviors, and physical threat actions/behaviors may be identified in the corresponding policies 129 to cause zone manager 123 to initiate and engage remediation manager 128. Remediation manager 128 may process remediation actions based on types of discovered threats and threat scores assigned to each type of threat utilizing a variety of processing actions, such as and by way of example only, 1) engaging an individual conducting a transaction or a task in a natural-language voice dialogue through speakers and microphones 130, 2) scheduling a remediation training from an offending staff member associated with the non-compliant actions, non-compliant behaviors, or non-compliant transaction information; 3) sending assistance information to a device associated with the offending individual for correctly performing the tasks; 4) generating a video clip from video feed 111 that corresponds to the non-compliant actions, the non-compliant behaviors, or non-compliant transaction information and sending the video clip to the offending individual and/or a supervisor of the offending individual; 5) sending a silent alarm to a security system; 6) sending alerts to staff regarding a potential threat (financial or physical) and recommended actions that the staff should take to ensure their safety and/or to protect assets of the enterprise; 7) tagging accounts associated with a perceived threat; 8) sending real-time video feeds from cameras 110 associated with a zone where the threat is occurring to a monitoring system or specific personnel; 9) tagging a staff member or a customer associated with the threat in the video feed; 10) activating additional sensors 130 for further in depth sensor data analysis on an individual associated with the threat; 11) notifying local governmental authorities in real time; and/or 12) passing all data collected for the threat to a reviewer for more-detailed review including a video clip that precipitated the remedial actions.

Remediation manager 128 may engage in any natural-language dialogue with the offending individual using a speaker and a microphone integrated into terminal 140, a user-operated mobile device 150, and/or network-based microphones and speakers 130 situated throughout the establishment. Additionally, the natural language dialogue may be conducted using a network-based appliance that is part of the Internet-of-Things (IoTs) and that is equipped with both a microphone and a speaker.

Remediation manager 128 may interface with a scheduling and training system associated with the establishment for purposes of scheduling remediation training of a known staff member of the enterprise.

System 100 provides frictionless security monitoring and management by providing self-autonomous monitoring of zones within an enterprise for threats (financial and physical), tracking of individuals and their actions/behaviors, and tracking of assets (objects). Remediation is also automated, which removes any subjectivity/bias associated with staff interpretation and which actively monitors staff for threats in addition to any customers of the enterprise. System 100 is frictionless because no actions are required by any staff member to perform the security monitoring, management, and remediation. System 100 is autonomous through zone definitions (as discussed above with object types and individual identifiers) and threat policies 129.

A variety of potential security monitoring, management, and remediation is now illustrated utilizing the above-noted context for system 100.

Person tracker 124 identifies an individual and reports the camera identifier for the camera to zone manager 123. Zone manager 123 determines from information reported by person tracker 124 that the individual is entering a monitored zone (public, private, a combination of public and private, or secure). Wireless communication sensors 130 scan the wireless communication network for any mobile device identifiers associated with registered user devices 150 assigned to a staff member and/or registered previously by a customer of the enterprise. The wireless identifiers are reported by sensors 130 to zone manager 123 as wireless device identifier sensor data. Zone manager 123 determines if the identifiers for devices 150 are linked to a customer account or a staff member of the enterprise. If device 150 is linked to a registered mobile app, zone manager 123 uses an Application Programming Interface (API) to engage the user-interface of the app (application) and authenticate the individual by using single-sign on (SSO) techniques, obtaining a biometric identifier for the individual, sending a one-time code to the device 150 for user entry, or other techniques that authenticate the individual and track a wireless digital data stream associated with that individual while within the enterprise.

When no user-device 150 is recognized and/or person tracker 124 was unable to biometrically authenticate the individual to a known customer or staff member, person tracker 124 maintains biometric features to track the individual to an unknown individual that is uniquely identifiable within the enterprise.

The known or unknown but uniquely identifiable individual continues to be tracked through the video feeds 111, any terminal activity at terminals 140, and any wireless activity through wireless sensors 130. The individual may also be monitored for spoken words through microphones 130. As long as the individual is within the enterprise, that individual's actions, behaviors, and any transactions are continuously monitored for threats (financial or physical) utilizing the appropriate threat policies 129 and information passed by trackers 124-126, sensors 130, and terminals 140.

If the individual engages a terminal 140 for a transaction, the transaction data is obtained, and the individual may then be identified to a linked account. The terminal 140 may be operated by the individual being monitored (such as when the terminal 140 is a Self-Service Terminal (SST) or an Automated Teller Machine (ATM)) or terminal 140 may be operated by staff of the enterprise (such as when the terminal 140 is teller operated). In such cases, an identity for the individual may be assigned by zone manager 123.

Zone manager 123 continuously attempts to assign a known identity to the individual while the individual journeys throughout the enterprise and moves from zone to zone or remains within a single zone. Unique information is gathered and maintained even when the individual does not have an assigned identity, such and individual is a known individual having an unknown or unassigned identity.

Behaviors and actions identified by tracker 126 are reported for the individual within the zones to zone manager 123. The policies 129 identify when conditions associated with threats (physical or financial) have been met and if such conditions are met, zone manager 123 engages remediation manager 128 to perform predefined remediation actions as was discussed above.

Behaviors can be identified by tracker 126 to identify physical treats and raise threat awareness levels with zone manager 123. For example, identification of weapons or weapon like objects; behavior indicating use of, or concealment of a weapon or weapon-like object; physical behaviors that indicate potential threatening or fraudulent behavior including: walking gait, repetitive movements, nervous movements, readjusting, touching, or moving a concealed and unidentified item, coordinating behavior with other individuals, etc. It is noted that spoken words captured by speakers 130 may provide indicators for some of these behaviors as well particularly when threatening language or words are picked up. The behaviors can be combined and evaluated for different indicators of threats (financial or physical) based on scoring the indicators and comparing scores against thresholds utilizing the threat policies 129 and a threat scoring mechanism. Once a threshold is reach, the remediation manager 128 may be instructed to act based on what has been ascertained by zone manager 123 and any threat score value and identity that may or may not have been determined during the individual's journey through the enterprise. In fact, all action-behavior identifiers, transaction data, video clips, and sensor data may be passed by zone manager 123 to remediation manager 128 along with the current threat score for processing appropriate remedial actions (as discussed above).

Each camera 110 provides time stamp and image-frame stamped video 111 to server 120. This video 111 can be streamed over a wired or wireless connection between cameras 110 and server 120 to a commonly accessible storage area on server 120 that is accessible to zone manager 123, person tracker 124, object tracker 123, behavior-action tracker 126, and remediation manager 128.

Each accessible video frame of each video feed 111 includes its metadata (minimally including what was discussed above) with its video frame on the server 120.

A variety of scenarios are possible with system 100 some of which but not all of which are now discussed.

Person tracker 124 may be equipped with biometric recognition, such that facial features of the individuals being tracked can be derived from the pixels of the video frames and matched to a registered individual or a known staff member of the enterprise. An enterprise-maintained identifier for the individual may then be recorded within a security log with security log entries.

It is noted that other biometric features may be used as well, such as and my way of example only, a fingerprint provided by a security system indicating that the individual was authenticated for performing a given task, a retina scan, a digit distance and length measurement, a palm reader, a voice print (captured by a microphone 130), etc. Additionally, features from the video feeds 111 do not have to only include facial features and can include any combination of features or a single set of features associated with the individuals: gait, extremity length, height, and/or facial features.

In an embodiment, zone manager 123 listens for keywords spoken an individual captured from microphones 130. When a keyword associated with distress or a threat is spoken, zone manager 123 raises a silent alarm and may notify one or more other individuals associated with the establishment.

Zone manager 123 may utilize a variety of sensors 130 after individuals have left or entered different rooms of the establishment after completion of a given task. Zone manager 123 may also utilizes sensors 130 to check that doors to rooms, windows, and/or drawers are in an appropriate state of unlocked or locked (closed or open).

In an embodiment, zone manager 123 maintains metrics associated with employees performing tasks/actions (including transactions) and customers journeying through the enterprise, such as time associated with a given task/action as a whole, time associated with a given action, time associated with a given set of actions, etc. Zone manager 123 may then provide an interface for searching, reporting, and mining the metrics. This can be used for continuous process improvements associated with the tasks, threat detection, and provides non-reputable evidence of non-compliance infractions associated with a given employee, and/or for employee evaluation and discipline.

In an embodiment, components of system 100 may include one or more trained-machine learning algorithms to assist in the security monitoring and management of actions and behaviors or the individuals engaged in tasks associated with threats (physical or financial) to the establishment.

The above-noted embodiments and other embodiments are now discussed with reference to FIGS. 2-4.

Figure 2:
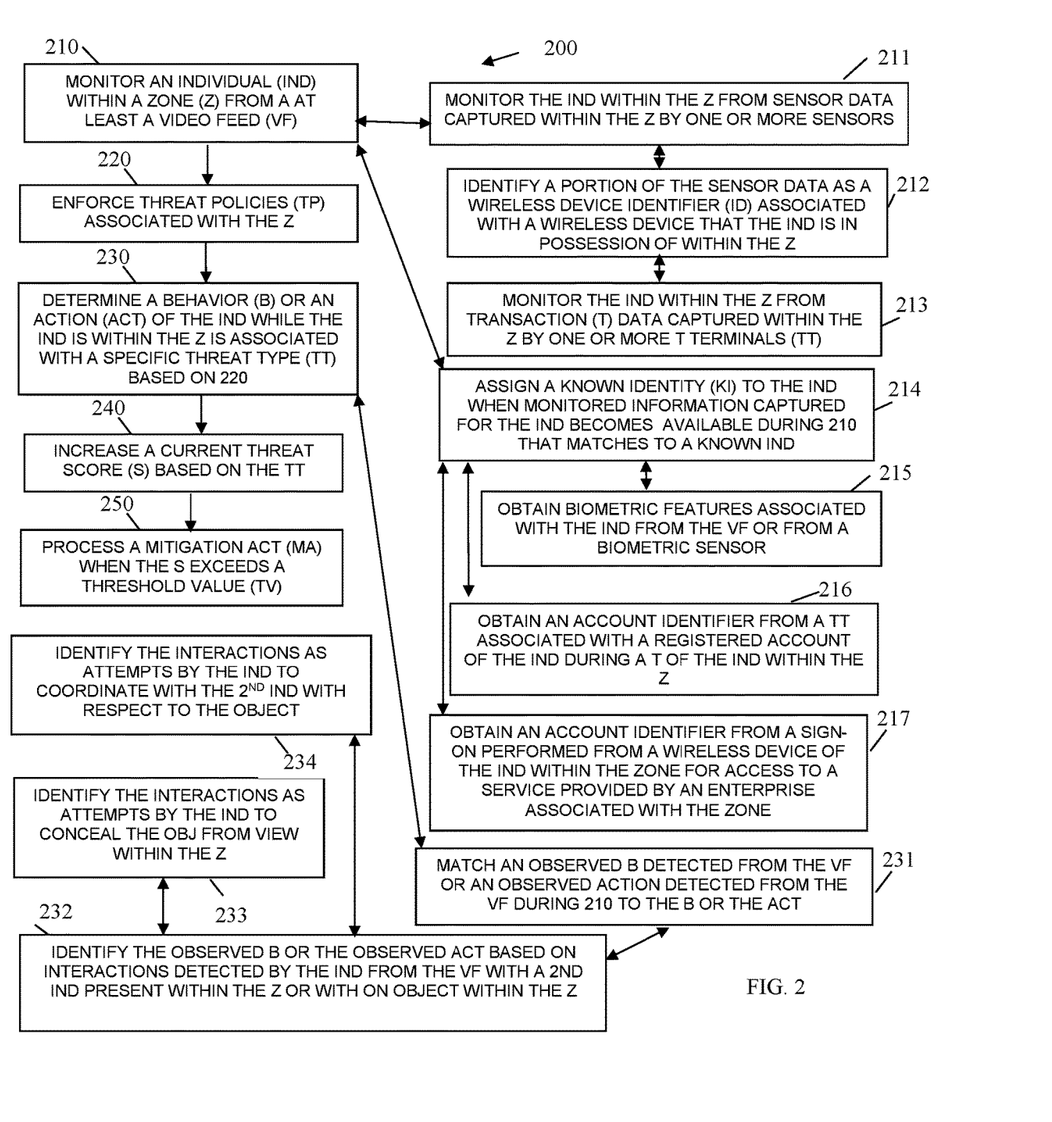
FIG. 2 is a diagram of a method frictionless security monitoring and management, according to an example embodiment.

FIG. 2 is a diagram of a method 200 for frictionless security monitoring and management, according to an example embodiment. The software module(s) that implements the method 200 is referred to as a "threat detection manager." The threat detection manager is implemented as executable instructions programmed and residing within memory and/or a non-transitory computer-readable (processor-readable) storage medium and executed by one or more processors of a device. The processor(s) of the device that executes the threat detection manager are specifically configured and programmed to process the threat detection manager. The threat detection manager may have access to one or more network connections during its processing. The network connections can be wired, wireless, or a combination of wired and wireless.

In an embodiment, the device that executes the threat detection manager is server 120. In an embodiment, server 120 is a cloud-based server, a local-area network (LAN)-based server, or a wide-area network (WAN) server.

In an embodiment, the threat detection manager is all or some combination of: zone manager 123, person tracker 124, object tracker 125, behavior-action tracker 126, zone setup manager 127, and/or remediation manager 128.

At 210, the threat detection manager monitors an individual within a zone from at least one real-time video feed provided by at least one camera 110.

In an embodiment, the threat detection manager, at 211, monitors the individual within the zone from sensor data captured within the zone by one or more sensors 130.

In an embodiment of 211 and at 212, the threat detection manager identifies a portion of the sensor data as a wireless identifier associated with a wireless device 150 that the individual is in possession of within the zone.

In an embodiment of 212 and at 213, the threat detection manager monitor the individual within the zone from transaction data captured within the zone by one or more transaction terminals 140.

In an embodiment, at 214, the threat detection manager assigns a known identity to the individual when monitored information captured for the individual becomes available during 210 that matches to a known individual.

In an embodiment of 214 and at 215, the threat detection manager obtains biometric features associated with the individual from the video feed or from a biometric sensor.

In an embodiment of 214 and at 216, the threat detection manager obtains an account identifier from a transaction terminal 140 associated with a registered account of the individual during a transaction of the individual within the zone.

In an embodiment of 214 and at 217, the threat detection manager obtains an account identifier from a sign-on performed from a wireless device 150 of the individual within the zone for access to a service provided by an enterprise associated with the zone.

At 220, the threat detection manager enforces threat policies 129 associated with the zone.

At 230, the threat detection manager determines a behavior or an action of the individual while the individual is within the zone is associated with a specific threat type based on 220.

In an embodiment, at 231, the threat detection manager matches an observed behavior detected from the video feed or an observed action detected from the video feed during 210 to the behavior or the action.

In an embodiment of 231 and at 232, the threat detection manager identifies the observed behavior, or the observed action based on interactions detected by the individual from the video feed with a second individual who is present within the zone or with respect to an object present within the zone.

In an embodiment of 232 and at 233, the threat detection manager identifies the interactions as attempts by the individual to conceal an object from view within the zone.

In an embodiment of 232 and at 234, the threat detection manager identifies the interactions as attempts by the individual to coordinate with the second individual with respect to the object.

At 240, the threat detection manager increases a current threat score based on the threat type.

At 250, the threat detection manager processes a mitigation action when the current threat score exceeds a threshold value. These can be any of the actions taken by the remediation manager 128 discussed above with the FIG. 1.

Figure 3:
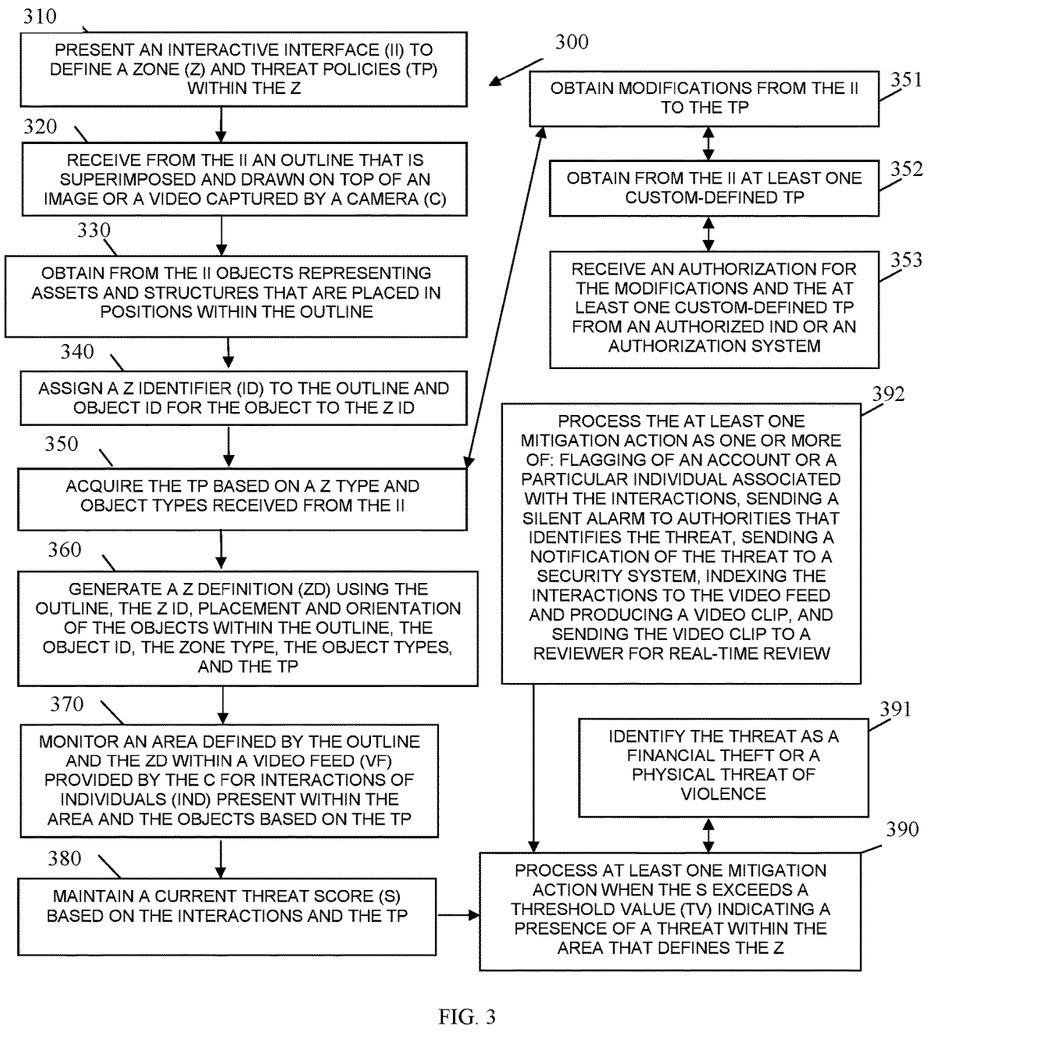
FIG. 3 is a diagram of another method for frictionless security monitoring and management, according to an example embodiment.

FIG. 3 is a diagram of another method 300 for frictionless security monitoring and management, according to an example embodiment. The software module(s) that implements the method 300 is referred to as an "autonomous threat assessor." The autonomous threat assessor is implemented as executable instructions programmed and residing within memory and/or a non-transitory computer-readable (processor-readable) storage medium and executed by one or more processors of a device. The processors that execute the autonomous threat assessor are specifically configured and programmed to process autonomous threat assessor. The autonomous threat assessor may have access to one or more network connections during its processing. The network connections can be wired, wireless, or a combination of wired and wireless.

In an embodiment, the device that executes the autonomous threat assessor is the server 120. In an embodiment, the server 120 is a cloud processing environment, a LAN server, or a WAN server.

In an embodiment, the autonomous threat assessor is all of or some combination of: zone manager 123, person tracker 124, object tracker 125, behavior-action tracker 126, zone set up manager 127, remediation manager 128, and/or the method 300.

The autonomous threat assessor presents another and, in some ways, enhanced processing perspective of the method 200 discussed above.

At 310, the autonomous threat assessor presents an interactive interface to define a zone and threat policies within the zone.

At 320, the autonomous threat assessor receives from the interactive interface an outline that is superimposed and drawn on top of an image or a video captured by a camera.

At 330, the autonomous threat assessor obtains from the interactive interface objects representing assets and structures that are placed in positions within the outline.

At 340, the autonomous threat assessor assigns a zone identifier to the outline and object identifiers for the objects to the zone identifier.

At 350, the autonomous threat assessor acquires threat policies 129 based on a zone type and object types received from the interactive interface.

In an embodiment, at 351, the autonomous threat assessor obtains modifications from the interactive interface to the threat policies.

In an embodiment of 351 and at 352, the autonomous threat assessor obtains from the interactive interface at least one custom-defined threat policy.

In an embodiment of 352 and at 353, the autonomous threat assessor receives an authorization for the modifications and the at least one custom-defined threat policy from an authorized individual or an authorization system.

At 360, the autonomous threat assessor generates a zone definition using the outline, the zone identifier, placement and orientation of the objects within the outline, the object identifiers, the zone type, the object types, and the threat policies.

At 370, the autonomous threat assessor monitors an area defined by the outline and the zone definition within a video feed provided by the camera for interactions of individual present within the area and the objects based on the threat policies.

At 380, the autonomous threat assessor maintains a current threat score based on the interactions and the threat policies.

At 390, the autonomous threat assessor processes at least one mitigation action when the current threat score exceeds a threshold value indicating a presence of a threat within the area that defines the zone.

In an embodiment, at 391, the autonomous threat assessor identifies the threat as a financial theft or a physical threat of violence.

In an embodiment, at 392, the autonomous threat assessor processes the at least one mitigation action as one or more of: flagging an account or a particular individual associated with the interactions, sending a silent alarm to authorities that identifies the threat, sending a notification of the threat to a security system, indexing the interactions to the video feed and producing a video clip, and sending the video clip to a reviewer for real-time review.

Figure 4:
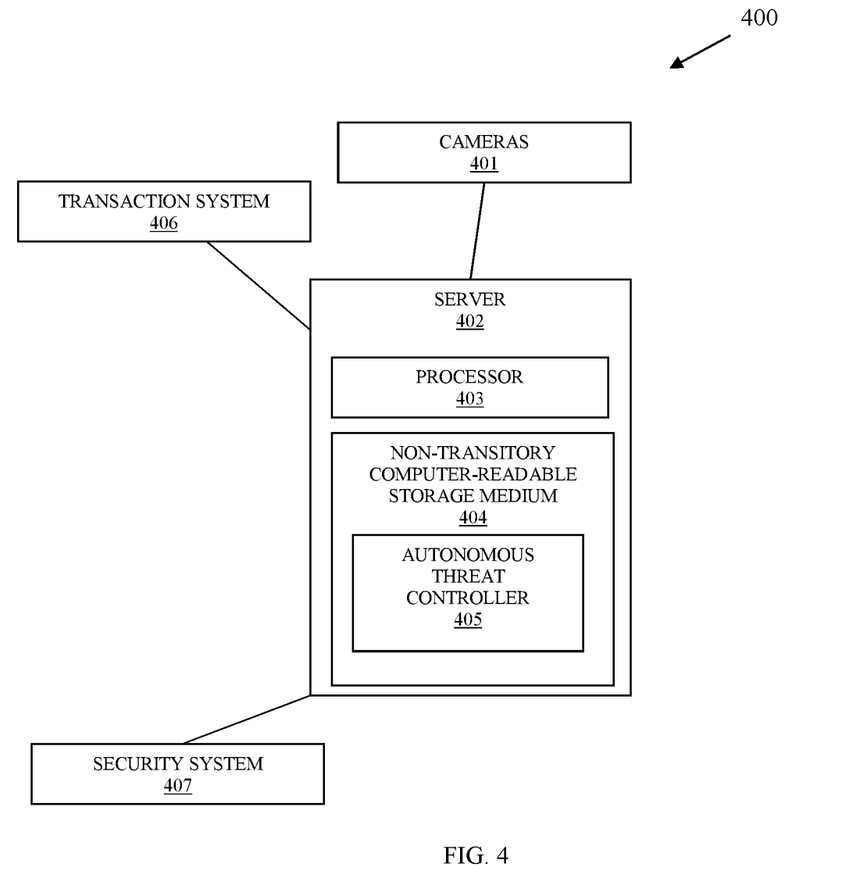
FIG. 4 is a diagram of another system for frictionless security monitoring and management, according to an example embodiment.

FIG. 4 is a diagram of a system 400 for frictionless security monitoring and management, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality cameras 401, a server 402, a transaction system 406, and a security system 407. The server 402 includes at least one hardware processor 403, a non-transitory computer-readable storage medium 404 having executable instructions representing an autonomous threat controller 405.

The cameras 401 capture real-time videos of public areas and private areas of an enterprise.

The transaction system 406 provides real-time transaction data for transactions of the enterprise.

The security system 407 processes security actions based on security threats within the enterprise.

The autonomous threat controller 405 when executed from the non-transitory computer-readable storage medium 404 on the processor 403 is configured to cause the processor 403 to perform processing comprising: 1) monitoring individuals and objects present in the videos based on zones defined from the public areas and the private areas; 2) determining based on behaviors or actions of the individuals with respect to one another or with respect to the objects and based on transaction data provided from the transaction system 406 when a threat is present based on the threat policies; and 3) process at least one mitigation action based on a threat type associated with the threat, wherein the at least one mitigation action includes sending an alert to the security system 407 when the threat type is associated with a physical threat of violence.

In an embodiment, the autonomous threat controller 405 when executed from the non-transitory computer-readable storage medium 404 on the processor 403 is configured to further cause the processor 403 to perform additional processing comprising one or more of: 4) engaging at least one of the individuals in a natural language voice dialogue to explain the threat and appropriate actions that are to be taken in view of the threat type; 5) activating one or more sensors to collect sensor data relevant to a particular individual and the threat.

In an embodiment, the autonomous threat controller 405 is all of or some combination of: zone manager 123, person tracker 124, object tracker 125, behavior-action tracker 126, zone setup manager 127, remediation manager 128, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
monitoring, by a processor, frames of a live video feed by analyzing pixels of the frames associated with a zone, wherein the zone is identified in the live video feed as an outline within the live video feed that is defined by known zone pixels;
tracking, by the processor, an individual present within the zone from the pixels within the frames and maintaining a first bounding box in the live video feed corresponding to the individual by identifying individual pixels for the individual in the live video feed that correspond to known person present pixels, and maintaining the first bounding box around the individual pixels within the live video feed;
assigning, by the processor, an initial threat score based on a presence of the individual within the zone;
identifying, by the processor, a behavior of the individual from the pixels within the frames by monitoring movements of the first bounding box within the zone, matching changes in the movements to a known behavior, and assigning a behavior identifier to the behavior;
matching, by the processor, the behavior identifier for the behavior to a threat type by linking the behavior identifier to one of a plurality of threat types; and
increasing, by the processor, the initial threat score based on the threat type to a current threat score.

2. The method of claim 1 further comprising, processing a mitigation action when the current threat score exceeds a predefined value.

3. The method of claim 1, wherein tracking further includes tracking objects present within the zone from the pixels within the frames relative to the individual.

4. The method of claim 1, wherein tracking further includes performing biometric recognition on features of the individual derived from the pixels of the frames.

5. The method of claim 4, wherein performing further includes assigning an identity to the individual based on the performing of the biometric recognition.

6. The method of claim 1, wherein assigning further includes obtaining a threat policy based on the zone and assigning the initial threat score from the threat policy.

7. The method of claim 6, wherein identifying further includes evaluating the threat policy and matching the behavior identifier to a portion of the threat policy.

8. The method of claim 7, wherein matching further includes obtaining the threat type from the portion of the threat policy during the evaluating.

9. The method of claim 8, wherein increasing further includes increasing the initial threat score by a predefined amount based on the threat type.

10. The method of claim 1, wherein increasing further includes performing an action based on a value of the current threat value for the individual exceeding a threshold value.

11. The method of claim 1, wherein increasing further includes increasing the current threat value to a further updated current threat value based on an action of the individual identified from the pixels of the frames with respect to an object of the zone or with respect to a second individual present in the zone.

12. A method, comprising:
obtaining, by a processor, a threat policy for a zone;
monitoring, by a processor, objects and individuals present in the zone from pixels of frames in a live video feed captured of the zone, wherein the zone is identified in the live video feed as an outline within the live video feed that is defined by known zone pixels;
maintaining, by a processor, object identifiers for the objects and individual identifiers for the individuals by correlating certain pixels present in the live video feed with known object pixels and known person pixels, assigning the object identifiers to the objects, assigning the individual identifiers to the individuals, maintaining first bounding boxes within the live video feed for the objects, labeling the first bounding boxes with the corresponding object identifiers, maintaining second bounding boxes within the live video feed for the individuals, labeling the second bounding boxes with the individual identifiers, and monitoring the first bounding boxes and the second bounding boxes within the live video feed;
assigning, by the processor, initial threat scores to each of the individual identifiers based on the threat policy, wherein the treat policy comprises rules for assigning the initial threat scores based on the object identifiers and the individual identifiers present within the zone, and wherein the threat scores labeled within the live video feed for each of the individuals;
assigning, by the processor, behavior identifiers for behaviors of the individuals and action identifiers for actions of the individuals based on the pixels of the frames in the live video feed by monitoring first movements within the second bounding boxes relative to the individuals, monitoring second movements within the first bounding boxes relative to objects, matching changes in the first movements and second movements to known behaviors and known actions, and assigning behavior identifiers and the action identifiers to the individuals based on the matching;
modifying, by the processor, the initial threat scores to current threat scores based on the behavior identifiers and the action identifiers and the threat policy by processing second rules defined in the threat policy with the behavior identifiers, the action identifiers, a zone identifier for the zone, and the initial threat scores; and
performing, by the processor, an automated action when a given current threat score exceeds a threshold threat score value defined in the threat policy.

13. The method of claim 12, wherein monitoring further includes performing biometric recognition on at least one of the individuals using pixels of the frames and assigning a known individual identity to at least one of the individual identifiers.

14. The method of claim 12, wherein monitoring further includes integrating sensor data captured from sensors within the zone with the monitoring of the objects and the individuals.

15. The method of claim 14, wherein integrating further includes identifying the sensor data as transaction data produced by a transaction terminal within the zone for at least one of the individuals, wherein the transaction terminal represented as one of the objects being monitored within the zone.

16. The method of claim 14, wherein integrating further includes identifying the sensor data as spoken audio captured from a microphone within the zone for at least one of the individuals.

17. The method of claim 16, wherein performing further includes engaging the at least one of the individuals in a natural language dialogue utilizing a speaker within the zone based on the spoken audio or based on the corresponding given threat score associated with the at least one of the individuals.

18. The method of claim 12 further comprising, processing the method as a self-autonomous monitor of the zone that monitors for financial and physical threats within the zone in real time and that performs remediations through the performing of the automated action.

19. A system, comprising:
cameras to stream a live video feed of a zone within an enterprise;
a transaction terminal comprising a processor coupled to a memory, the memory including instructions executed by the processor to process transaction within the zone and to produce transaction data for the transactions;
a server comprising a server processor coupled to a server memory, the server memory including instructions executed by the server processor to:
monitor the zone by analyzing pixels of frames in the live video feed to identify individuals present within the zone and to identify actions or behaviors of the individuals within the zone by outlining the zone within the live video feed using known zone pixels, correlating known person pixels to individual pixels for the individuals within the live video feed, maintaining first bounding boxes within the live video feed corresponding to the individuals, monitoring movements of the individuals within the first bounding boxes, matching the movements to known behaviors, assigning the behavior identifiers, matching second movements of the individuals to known actions, and labeling the behavior identifiers and action identifiers on the first bounding boxes for the corresponding individuals within the live video feed;
associate the transaction data with at least one individual based on analyzing pixels of the frames in the live video feed and correlating the at least one individual in the corresponding first bounding box with the transaction;
maintain a current threat score for the at least one individual based on a corresponding action or a corresponding behavior of the at least one individual and based on the transaction data obtained from the transaction terminal based on rules enforced for a threat policy; and
perform an automated action when the current threat score exceeds a predefined value based on second rules associated with the current threat score.

20. The system of claim 19, wherein the transaction terminal is a Self-Service Terminal (SST) or an Automated Teller Machine within the enterprise.

* * * * *